US008615334B2

(12) United States Patent
Ewert

(10) Patent No.: US 8,615,334 B2
(45) Date of Patent: Dec. 24, 2013

(54) REMOTE CONTROL KIT SYSTEM FOR FULL-SIZED VEHICLE

(76) Inventor: Terry Ewert, Dorchester, WI (US)

( * ) Notice: Subject to any disclaimer, the term of this patent is extended or adjusted under 35 U.S.C. 154(b) by 953 days.

(21) Appl. No.: 12/121,953

(22) Filed: May 16, 2008

(65) Prior Publication Data

US 2008/0288142 A1 Nov. 20, 2008

Related U.S. Application Data

(60) Provisional application No. 60/930,719, filed on May 18, 2007.

(51) Int. Cl.
*G01D 5/00* (2006.01)
*B60W 30/00* (2006.01)

(52) U.S. Cl.
USPC .................................. 701/2; 701/48

(58) Field of Classification Search
USPC ......... 701/2, 48; 180/167, 320; 318/581, 587, 318/625; 74/473.3
See application file for complete search history.

(56) References Cited

U.S. PATENT DOCUMENTS

| | | | | |
|---|---|---|---|---|
| 3,877,318 A | * | 4/1975 | Castoe | 74/481 |
| 4,046,262 A | | 9/1977 | Vykukal et al. | |
| 4,442,708 A | * | 4/1984 | Gable et al. | 73/118.01 |
| 4,742,720 A | | 5/1988 | Storck | |
| 4,855,822 A | | 8/1989 | Narendra et al. | |
| 5,172,589 A | | 12/1992 | Witt | |
| 5,240,207 A | | 8/1993 | Eiband et al. | |
| 5,448,479 A | * | 9/1995 | Kemner et al. | 701/23 |
| 5,615,581 A | | 4/1997 | Cordioli | |
| 5,816,106 A | * | 10/1998 | Froelich | 74/473.31 |
| 5,821,718 A | * | 10/1998 | Shaffer et al. | 318/587 |
| 5,835,867 A | * | 11/1998 | Froelich et al. | 701/2 |
| 5,865,266 A | * | 2/1999 | Froelich et al. | 180/443 |
| 5,913,945 A | * | 6/1999 | Froelich et al. | 74/512 |
| 5,991,674 A | * | 11/1999 | Froelich et al. | 701/36 |
| 5,994,853 A | * | 11/1999 | Ribbe | 318/16 |
| 6,108,031 A | * | 8/2000 | King et al. | 348/118 |
| 6,112,608 A | * | 9/2000 | Spravsow et al. | 74/335 |
| 6,535,793 B2 | * | 3/2003 | Allard | 700/259 |
| 6,860,829 B2 | | 3/2005 | Bock et al. | |
| 6,923,281 B2 | * | 8/2005 | Chernoff et al. | 180/65.245 |
| 7,628,239 B1 | * | 12/2009 | Louie et al. | 180/167 |
| 2003/0047362 A1 | * | 3/2003 | Chernoff et al. | 180/65.2 |
| 2006/0011397 A1 | * | 1/2006 | Huang et al. | 180/167 |
| 2006/0254839 A1 | * | 11/2006 | Hasty et al. | 180/167 |

* cited by examiner

*Primary Examiner* — Jason Holloway
(74) *Attorney, Agent, or Firm* — Westman, Champlin & Koehler, P.A.; Z. Peter Sawicki

(57) ABSTRACT

A remote control kit system for installation in a full-sized vehicle, the kit for remotely controlling the vehicle, the kit including an engine starter module servo, a steering module, a brake and throttle module, a gear shift module servo and a hand-held remote controller unit. The present invention also includes a method for installing such a system. A hand-held remote controller unit sends signals which are received by the simple mechanical actuators which in turn directs the vehicle to start, to turn, to shift gears, to brake and or to accelerate as required. No permanent modification to the existing vehicle is required.

7 Claims, 19 Drawing Sheets

REMOTE CONTROL KIT SYSTEM FOR FULL-SIZED VEHICLE

CROSS-REFERENCE TO RELATED APPLICATION

The present application is based on and claims the benefit of U.S. provisional patent application Ser. No. 60/930,719, filed May 18, 2007, the content of which is hereby incorporated by reference in its entirety.

BACKGROUND OF THE INVENTION

The present invention is directed generally to a remotely controlled vehicle, and more particularly, to a remote control kit system for operating a factory-made full-sized automotive vehicle, the kit including an engine starter, a steering module, a brake and throttle module, a gear shift module and a hand-held remote controller unit and a method for installing such a system.

Remote controlled vehicles are used in military applications as targets and as means to check roadways for mines and other booby traps.

Remote control actuators for steering wheels have been used. Examples of such steering wheel actuators are described in the following patents:

| Name | U.S. Pat. No. |
| --- | --- |
| Witt | 5,172,589 |
| Cordioli | 5,615,581 |
| Storck | 4,742,720 |

Robots have been used to control automotive vehicles. Examples of such robot controlled vehicles include the following patents:

| Name | U.S. Pat. No. |
| --- | --- |
| Froelich | 5,835,867 |
| Froelich | 5,865,266 |
| Froelich | 5,991,674 |
| Shaffer | 5,821,718 |

SUMMARY OF THE INVENTION

The present invention includes a remote control kit system for remotely controlling a full-sized vehicle. The kit includes an engine starter module servo, a steering module, a brake and throttle module, a gear shift servo and a hand-held remote controller unit. The present invention also includes a method for installing such a kit system.

A hand-held remote controller unit sends signals which are received by simple mechanical actuators which in turn direct the vehicle to start, to turn, to shift gears, to brake or to accelerate as required. No permanent modification to the existing vehicle is required.

DETAILED DESCRIPTION OF ILLUSTRATIVE EMBODIMENTS

Servo refers to a servomechanism, an electronic control system in which a hydraulic, pneumatic or other type of controlling mechanism is actuated and controlled by a low-energy signal.

Figure 1:
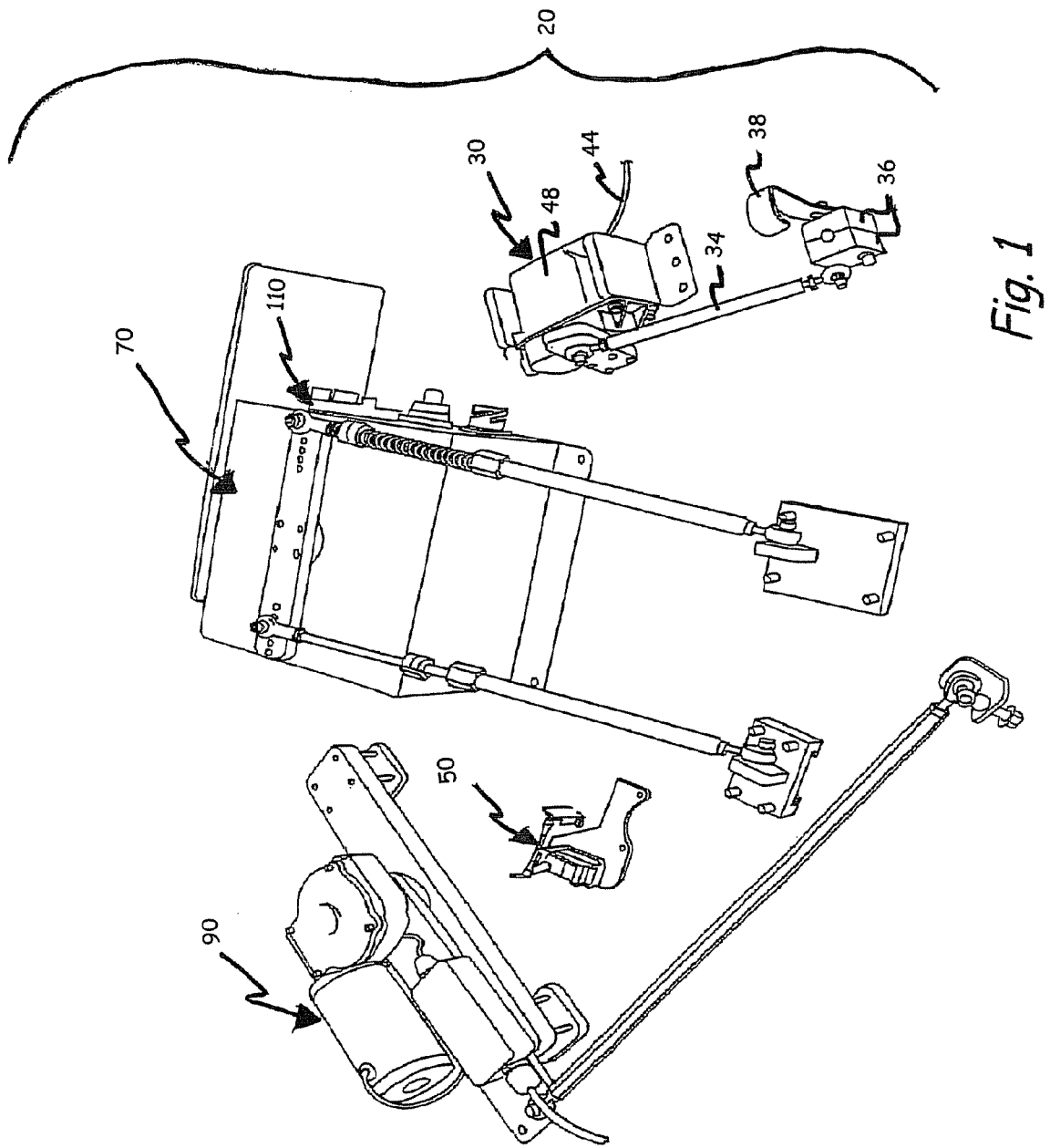
FIG. 1 is a perspective view of the mechanical actuators that comprise the kit used in the present invention.
Figure 2:
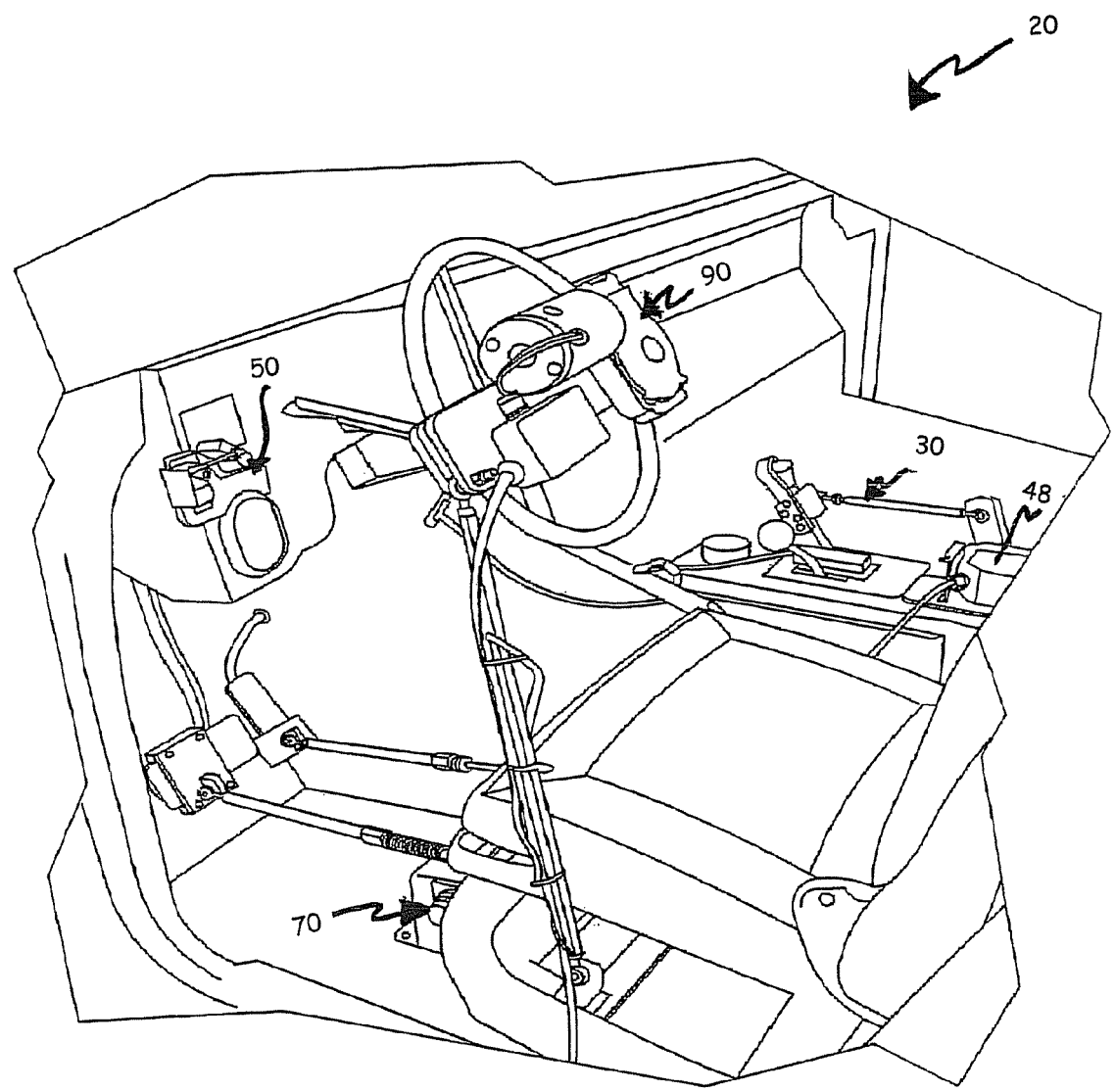
FIG. 2 is a side perspective view of the mechanical actuators installed in their place of use.

A remote control kit system for use in a full sized vehicle, indicated generally at 20 in FIGS. 1 and 2, is used for driving a vehicle from a position remote from the vehicle such that the vehicle may be sent into a location dangerous for a driver and passenger. The remote control kit system 20 may be installed without need for removal of the driver or passenger seats. The remote control kit system 20 requires no permanent modification of the existing vehicle. Each module may be installed adjacent the relevant device in the normally installed vehicle, for example the remote starter module 50 is positioned adjacent the normal vehicle starter, the gear shift module 30 is positioned adjacent the normal vehicle gear shift, the brake/throttle module 70 adjacent the normal brake and throttle, and the steering module 90 is positioned on the normal steering wheel with an arm element anchored adjacent the driver's side seat. Signals transmitted from a hand-held device are received by a signal receiver mounted on the brake/throttle control unit, processed and electrical transmissions are sent to the appropriate module for actuation thereof. The components of the remote control kit system may be uninstalled without permanent modification of the vehicle.

The components of the remote control kit system 20 for a full sized vehicle are illustrated in FIG. 1 with the gear shift module shown generally at 30, the starter module shown generally at 50, the brake/throttle module shown generally at 70 and the steering module shown generally at 90. These components are used to convert a standard, factory made vehicle to a remote controlled vehicle with the installation of these component parts. The component parts are installed in such a manner they can be dis-installed and the vehicle operated in the normal manner if so desired. Additionally, all electrical component controls are housed in a standard electrical enclosure and the cable ends all have military specification connectors.

Gear Shift Module

Figure 3:
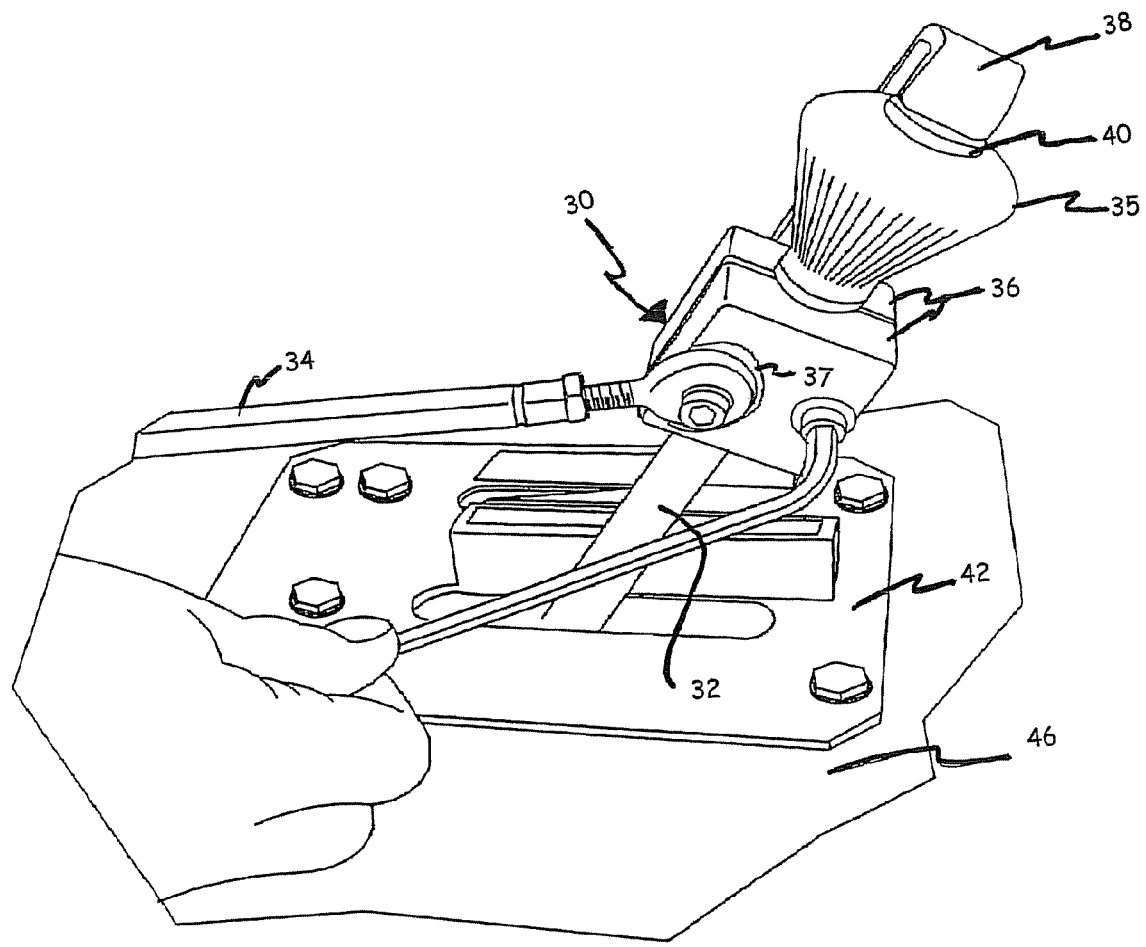
FIG. 3 is a fragmentary right side perspective view of the gear shift servo being installed.
Figure 4:
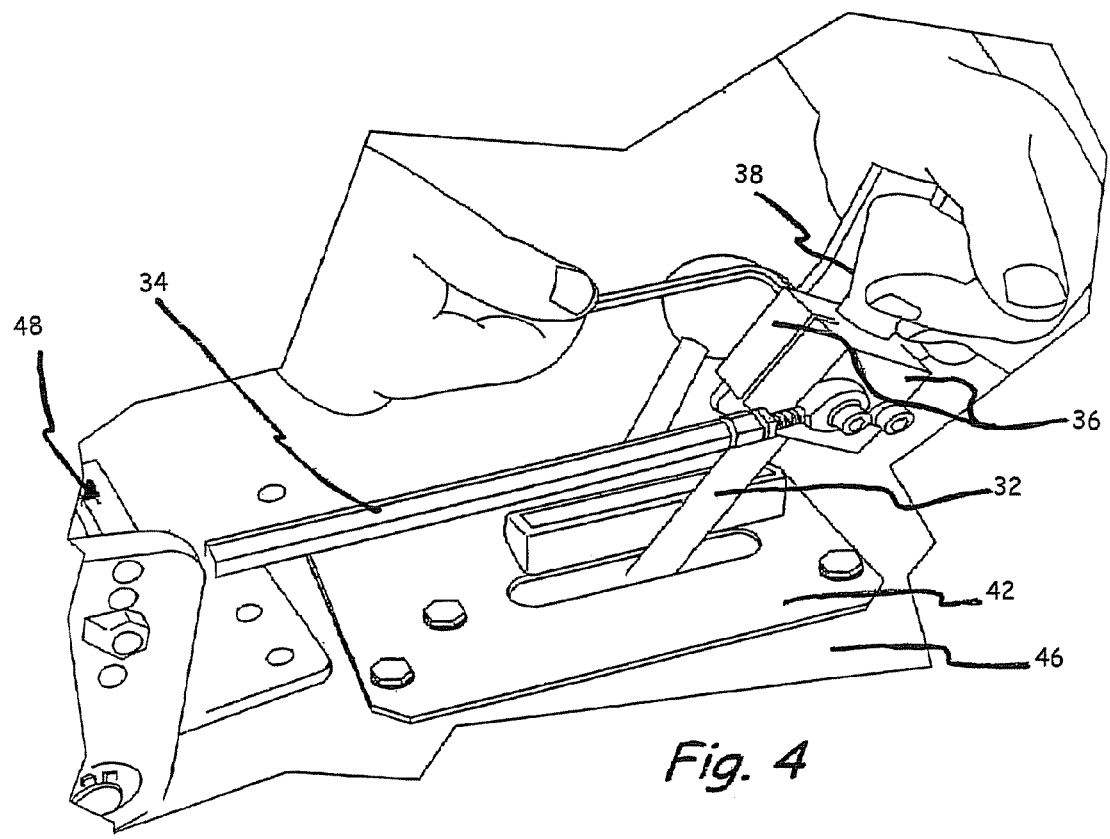
FIG. 4 is a fragmentary side perspective view of the gear shift servo with the hold down bracket being installed to position the shifter button in position to allow the gear to be shifted.
Figure 5:
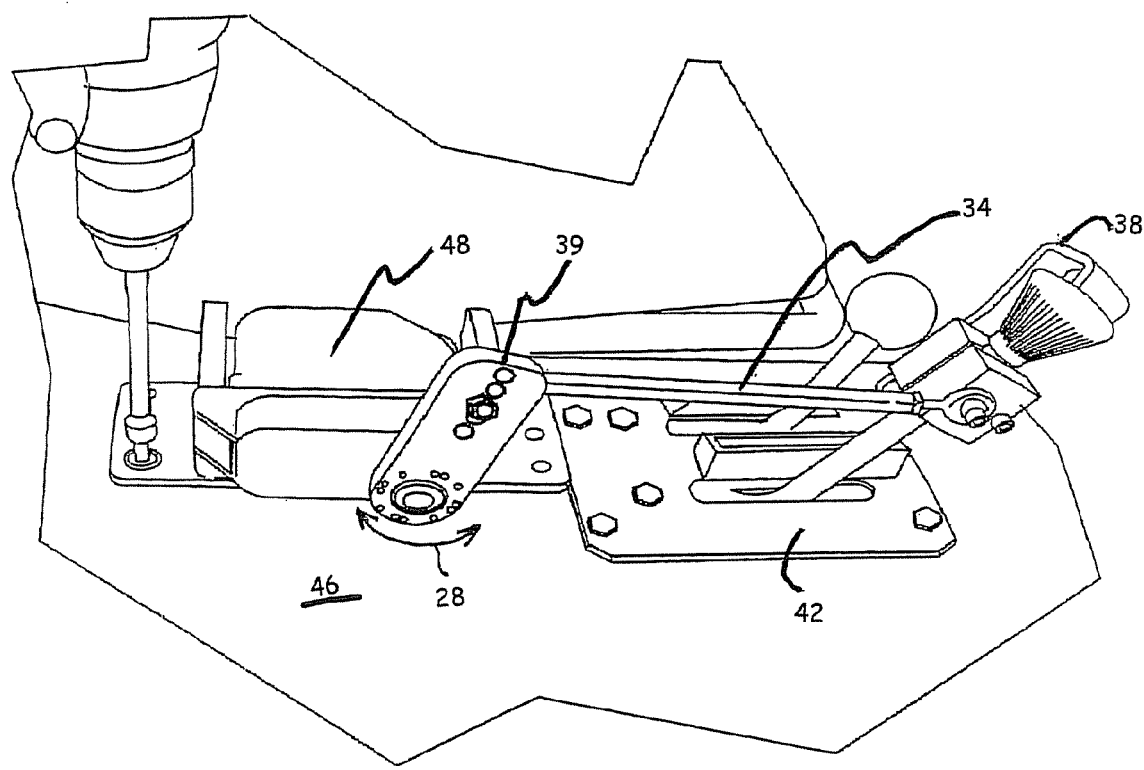
FIG. 5 is a fragmentary side perspective view of the gear shift servo with the servo bracket and mount being installed.

The gear shift module 30, illustrated in detail in FIGS. 3-5 and in a position of use in FIG. 2, has a two-piece shifter clamp block 36 for mounting the gear shift module 30 to the gear shift stem 32 of the vehicle. The two-piece shifter clamp block 36 is of a clam-shell configuration with a central aperture for clamping around the gear shift stem 32. Fastening means are provided to hold the two-piece shifter clamp block 36 in place. A hold-down bracket 38 is mounted to the two-piece shifter clamp block 36 provided to depress the shifter button 40 of the vehicle. Holding down the shifter button 40 permits the gear shift stem 32 to be moved in the normal manner. Shift servo motor 48 is mounted to the vehicle. A shift bracket 39 is mounted at one end to the servo motor at another end to a shift linkage arm 34. The shift linking arm 34 is pivotally mounted at another end to the two-piece shifter clamp lock 36. Shift linkage arm 34 is also pivotally attached to the bracket 39. It will be appreciated that when the servo motor turns the bracket in the general direction of arrow 28, that such movement will also cause the gear shift stem 32 to move the shifting gears. Electrical signals received from the remote controller to a receiver by the electrical control box 48 result in the shifter button 40 being depressed permitting the linkage arm 34 to move the vehicle gear shift stem 32. Shift linkage arm 34 is adjustable and may be adjusted to fit the space available. Gear shift console 46 and gear shift console cover 42 are also illustrated in FIGS. 4 and 5.

Engine Starter Module

Figure 6:
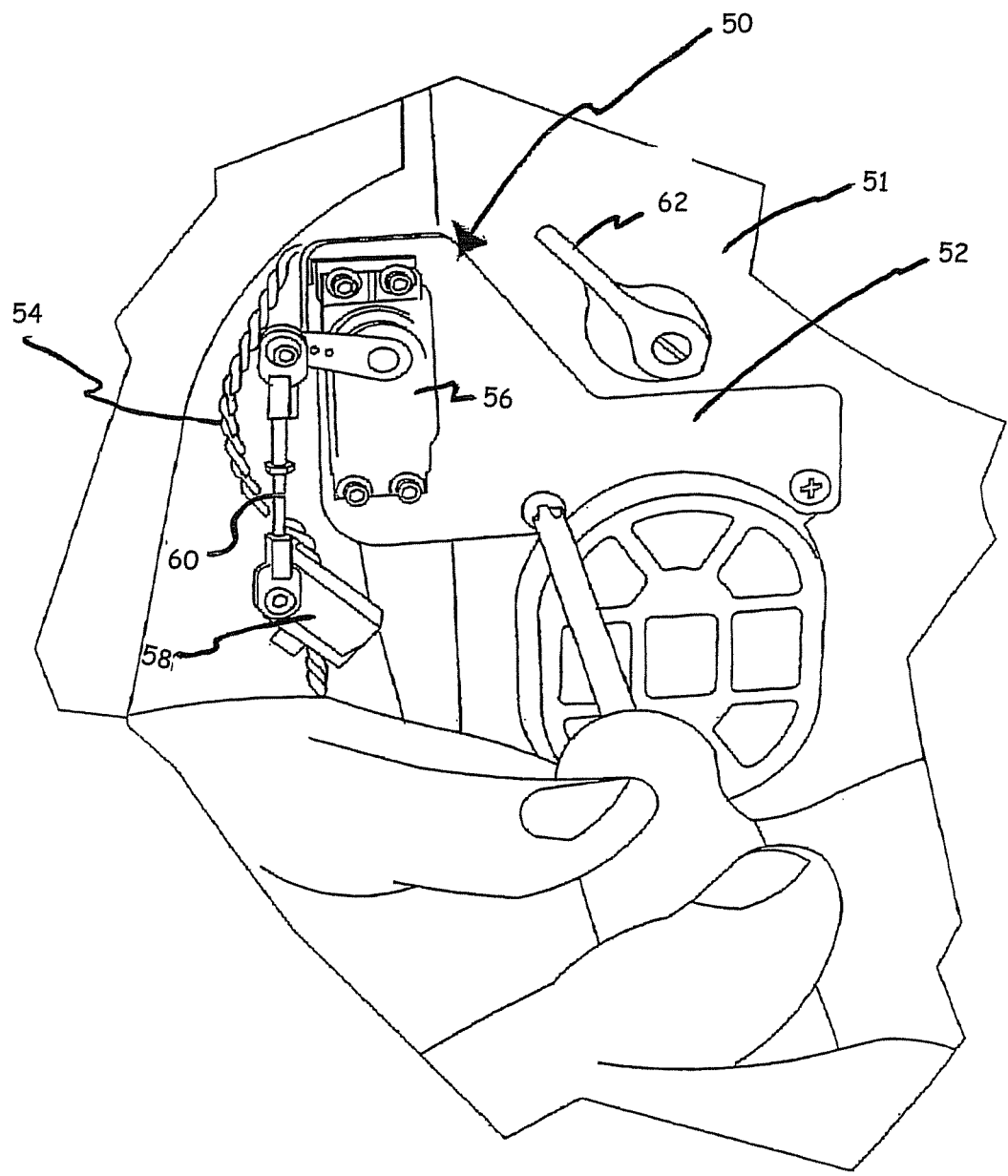
FIG. 6 is a fragmentary side perspective view of the engine start servo bracket being installed onto the dashboard of the vehicle.
Figure 7:
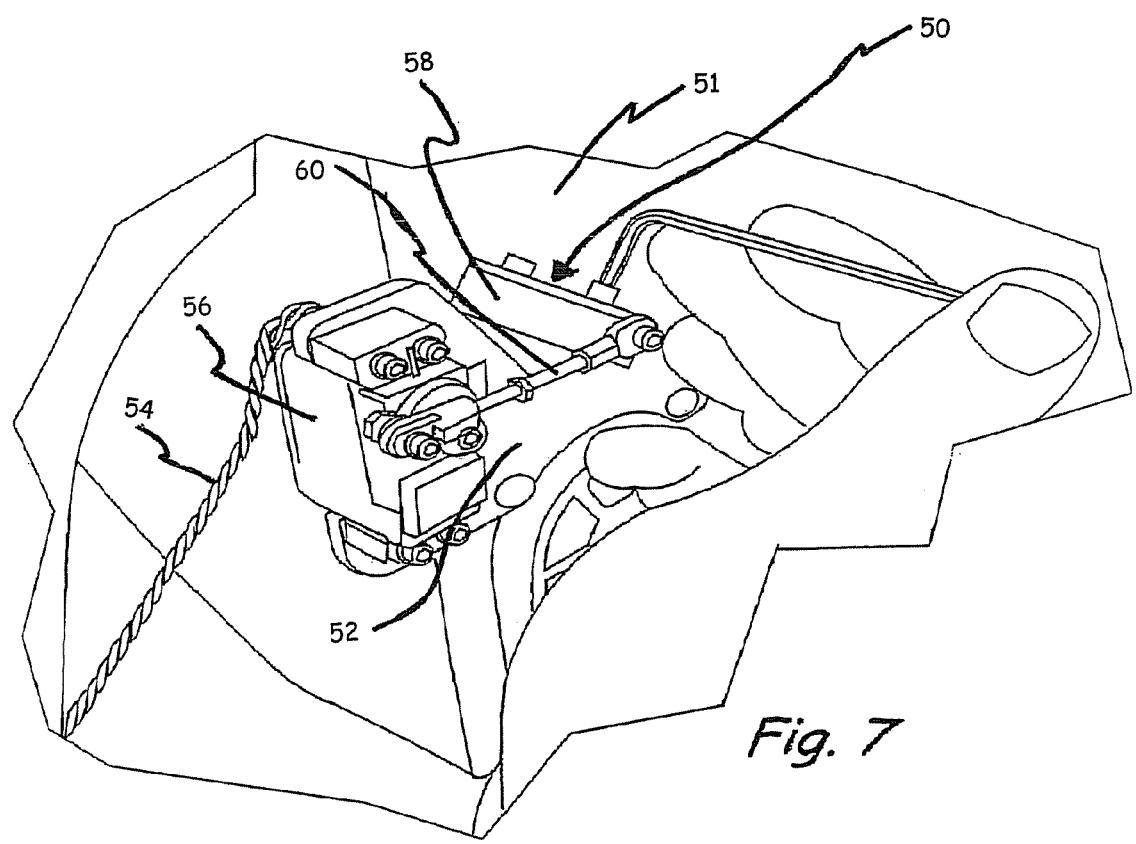
FIG. 7 is a fragmentary side perspective view of the engine start servo bracket of FIG. 6 with the clamp block being installed adjacent the engine start servo.

The engine starter module 50 is mounted to the dashboard 51 by means of a mounting bracket 52 and fastener means. Switch module actuator 56 has a linkage arm 60 that terminates in a knob clamp block 58 that is attached to starter 62. Linkage arm 60 moves in response to actuation of the switch module 56 to actuate the knob clamp block 58 mounted to the starter switch 62 engaging the engine of the vehicle in the normal manner. Electrical connection to switch module actuator 56 is provided through electric wiring 54. Components of the engine starter module 50 are illustrated in FIGS. 6 and 7.

Brake/Throttle Module

Figure 8:
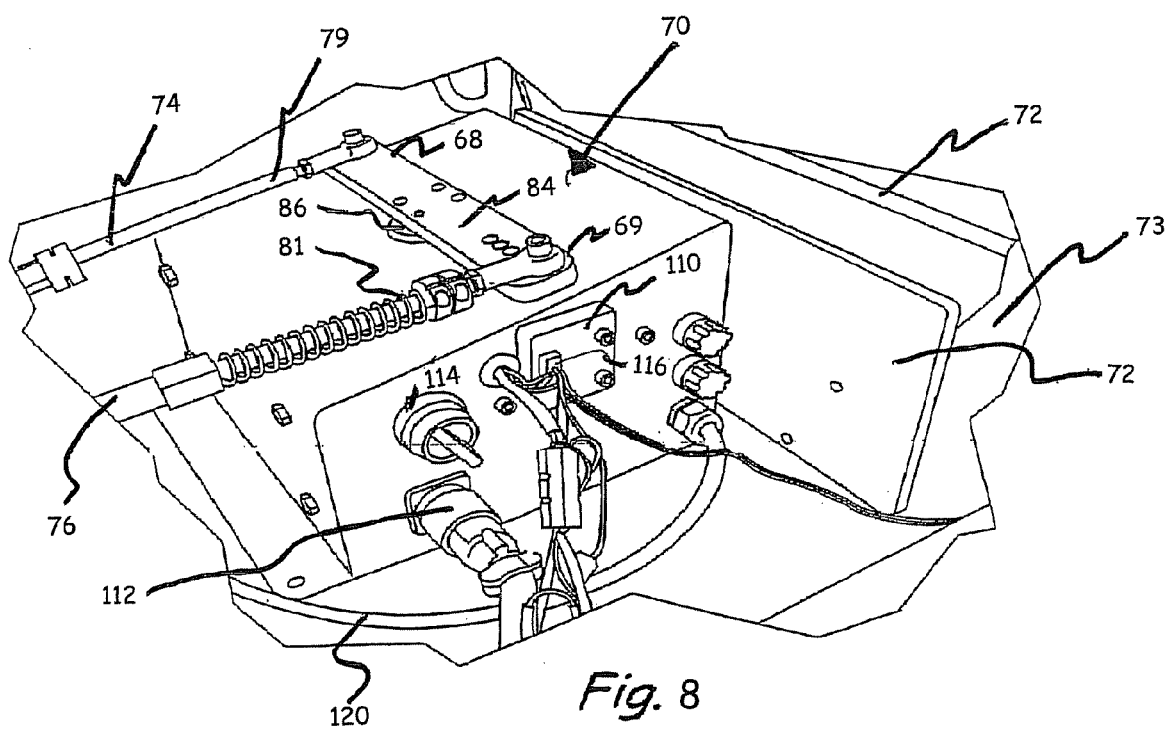
FIG. 8 is a fragmentary side perspective view of the brake/throttle module box being installed on the vehicle floor in front of the driver's seat.
Figure 9:
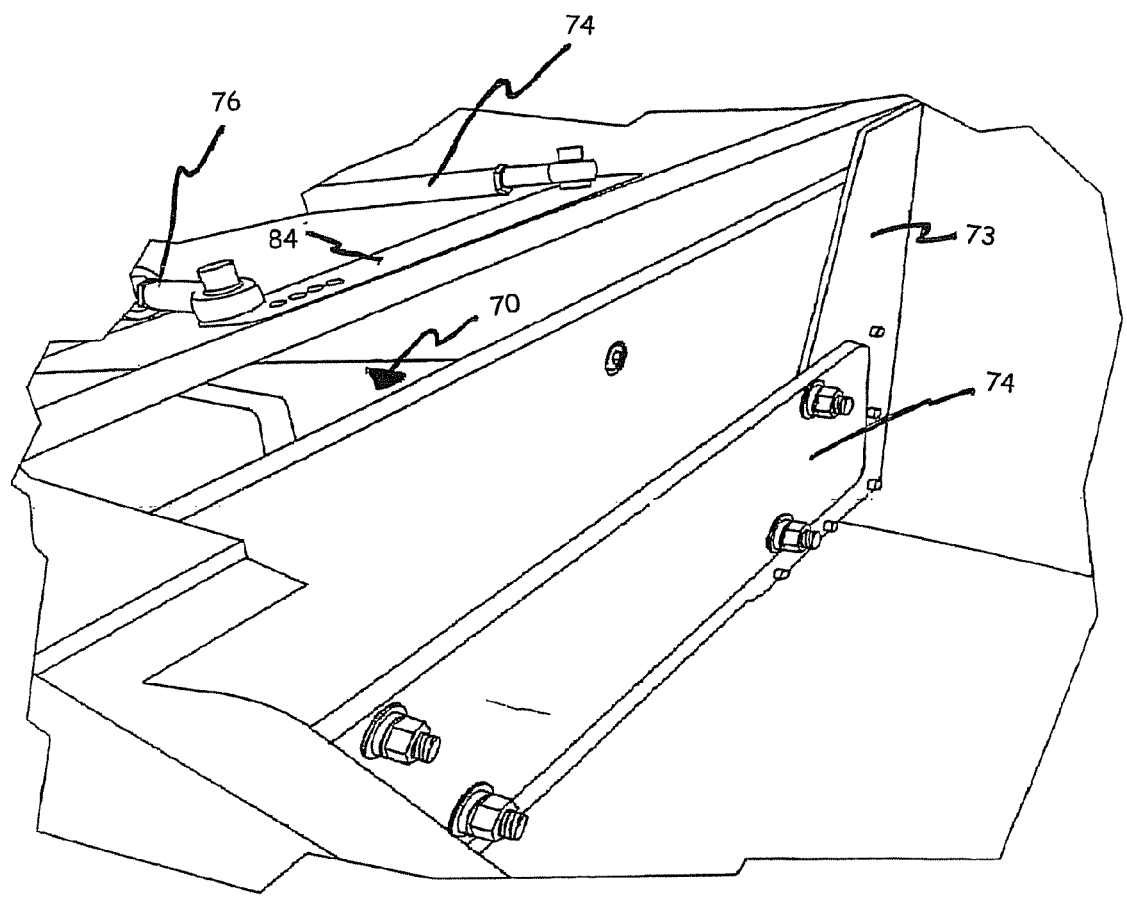
FIG. 9 is fragmentary side perspective view of the brake/throttle module of FIG. 8, the view taken from the back side showing the clamp bar holding the brake/throttle module in position under the driver's seat.
Figure 10:
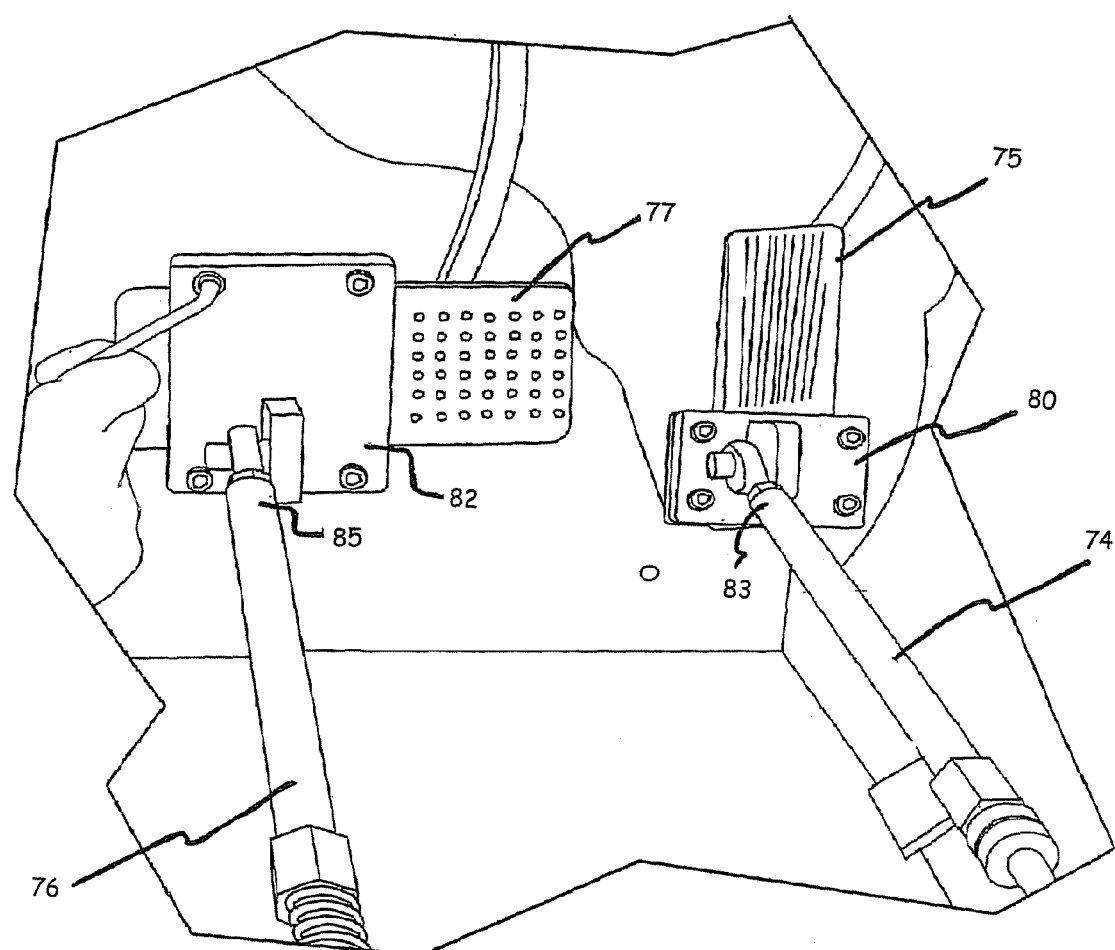
FIG. 10 is fragmentary side perspective view of the brake/throttle module of FIG. 8 with pedal clamps being installed on both the brake and throttle pedals.
Figure 11:
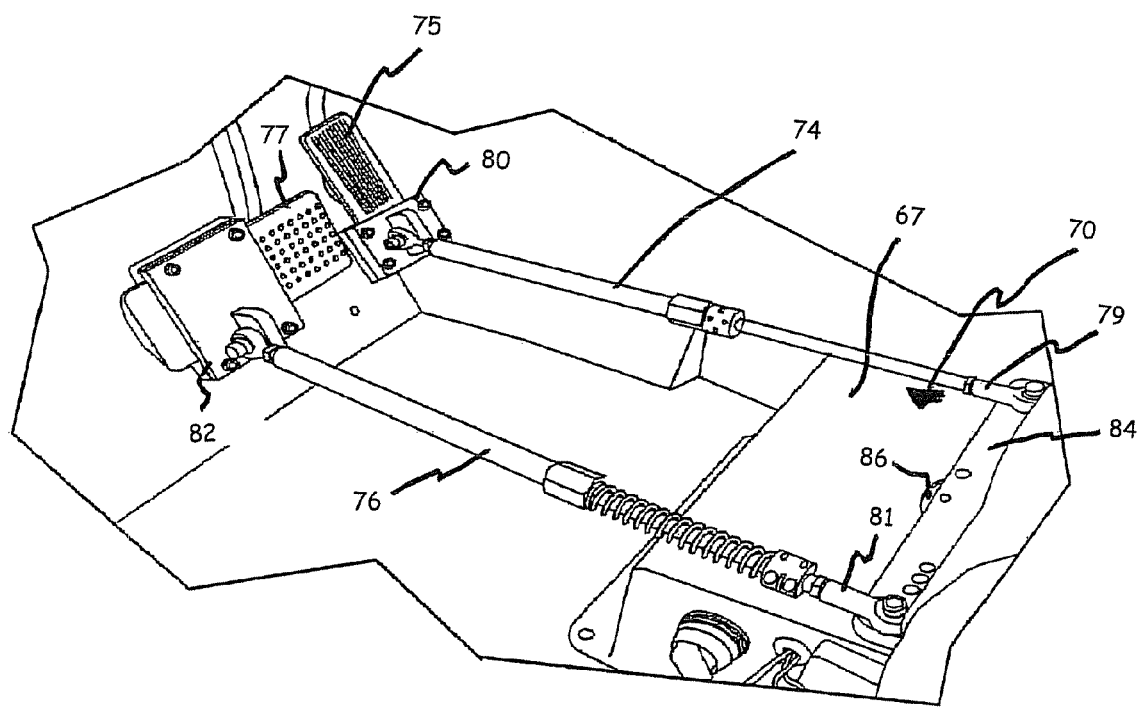
FIG. 11 is fragmentary side perspective view of the brake/throttle module installed in its position of use.
Figure 12:
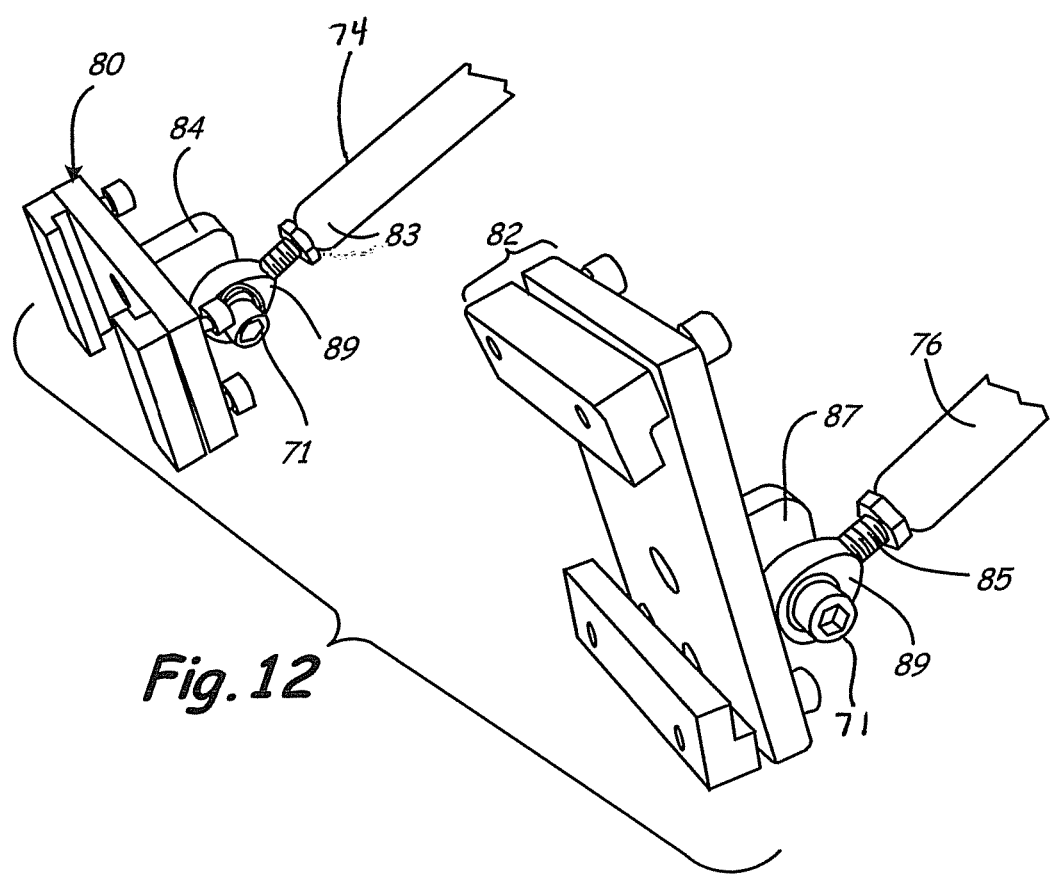
FIG. 12 is fragmentary side perspective view of the pedal clamps of the brake/throttle module of FIG. 10.

The brake/throttle module, illustrated generally at 70 in FIGS. 8-11, is positioned on the vehicle floor in front of the driver's seat. It is fastened into place by means of a clamp bar 72 positioned behind the driver's seat mount 73 and fastening means. Throttle linkage arm 74 is mounted at a proximal end 79 to a first end 68 of actuation bar 84 of brake/throttle module 70 and at a distal end 83 to a brace 87 formed as part of a three-piece throttle pedal clamp 80. Three-piece throttle pedal clamp 80, having a generally planar top portion and two generally L-shaped bottom portions fit around the side edges of throttle pedal 75 and clamp to throttle pedal 75 by fastening means, such as nuts and bolts, as illustrated in FIG. 12. Throttle linkage arm 74 is mounted to brace 87 which projects perpendicularly from the planar top portion of pedal clamp 80. Brake linkage arm 76 is also mounted at a proximal end 81 to a second end 69 of actuation bar 84 of brake/throttle module 70 and at a distal end 85 to brace 87 of three-piece brake pedal clamp 82. Three-piece brake pedal clamp 82 is mounted to brake pedal 77 by means similar to throttle pedal 75. A two-piece pedal clamp could be used to sandwich the pedal between the two portions of a clamp. If needed, the length of throttle linkage arm 74 or brake linkage arm 76 can be adjusted. Actuation bar 84 is mounted to a servo motor (not shown) within housing 67 for pivotal movement to brake/throttle module 70 such that, when the gear shift is in a neutral position, the actuation bar 84 is positioned perpendicularly across brake/throttle module 70, as illustrated in FIGS. 8-10. The receiver 110 is mounted on the housing 67 and provides a signal to the brake throttle servo motor such that the brake throttle servo motor is actuable pivotally moving the actuation bar 84. When throttle is needed, actuation bar 84 pivots such that the throttle pedal is depressed and the brake pedal is lifted. When braking is needed, actuation bar 84 pivots to push brake linkage arm 76 and throttle linkage arm 74 is lifted. Actuation bar 84, in electrical communication with receiver 110, pivots in response to movement of pivot 86 mounted in brake throttle module 70 in response to electrical signals from receiver 110 mounted on the housing 89.

Steering Module

Steering module 90 is clamped onto the vehicle steering wheel 81 by means of a steering wheel mount bar 94, a generally planar rectangular shaped support positioned across the steering wheel 81, the steering wheel mount bar 94 clamped into place by a pair of generally planar shaped clamp plates 95. Steering module 90 has an actuation motor 92 mounted on a front side thereof in electrical connection with receiver 110.

Figure 14:
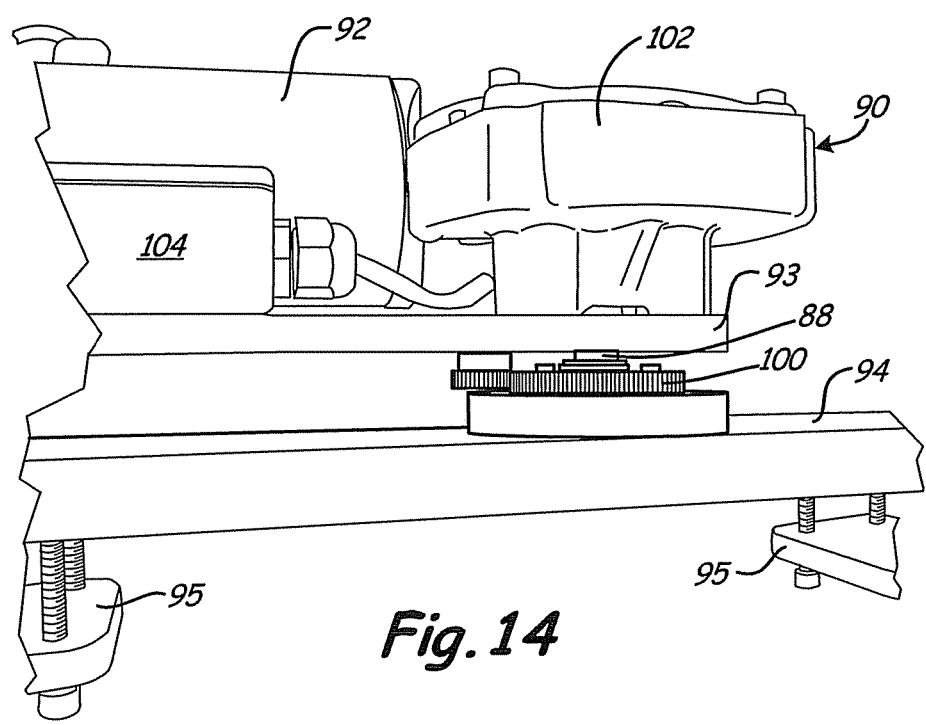
FIG. 14 is fragmentary side perspective view of the steering mount of FIG. 13 with the torque arm and bracket being installed.
Figure 15:
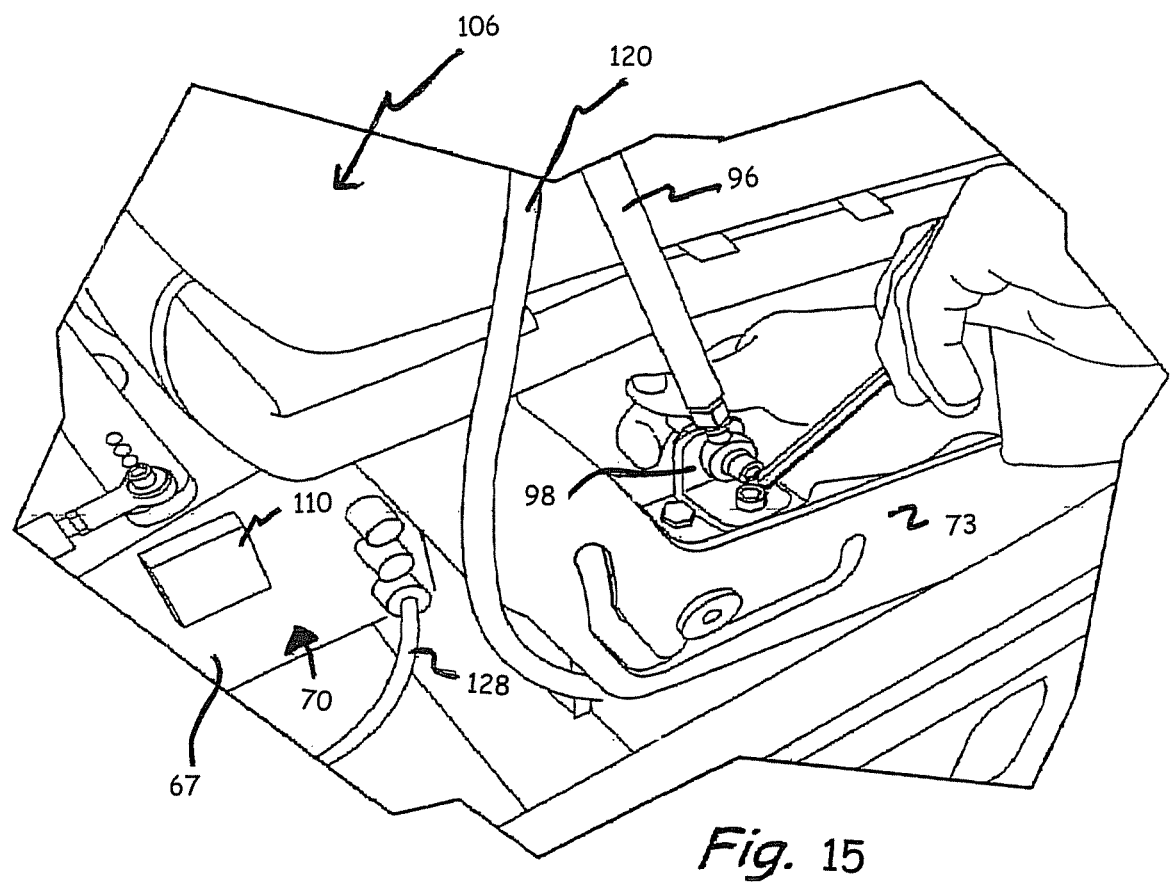
FIG. 15 is fragmentary side perspective view of the torque arm of the steering mount of FIGS. 13 and 14 anchored to the vehicle floor adjacent the driver's seat and with the steering electrical cable connected to the mating connector on the brake module box of FIG. 8.

Steering module 90, with actuation motor 92, drive gear box 102 and electrical connector 120 are mounted on a motor mount bar 83, the assembly pivotally mounted on steering wheel mount bar 94 by steering pivot 100 as illustrated at FIG. 14. This permits the steering module 90 to stay in a generally horizontal position while the steering wheel 91 turns. Mounted at one end of motor mount bar 93 is torque arm 96. Torque arm 96 is mounted at a distal end 95 to a torque arm bracket 98 to driver's seat mount 73, adjacent driver's seat 106, as illustrated in FIG. 15. Steering electrical cable 120 provides electrical communication between steering module 90 and brake/throttle module 70. Torque arm 96 stabilizes steering module 90 when steering wheel 91 is turned by drive gear 102. Upon receiving a signal, actuation motor 92 turns drive gear 102 which rotates steering stem 88 effecting the steering wheel 91 in the normal manner.

Hand-held Unit

Figure 16:
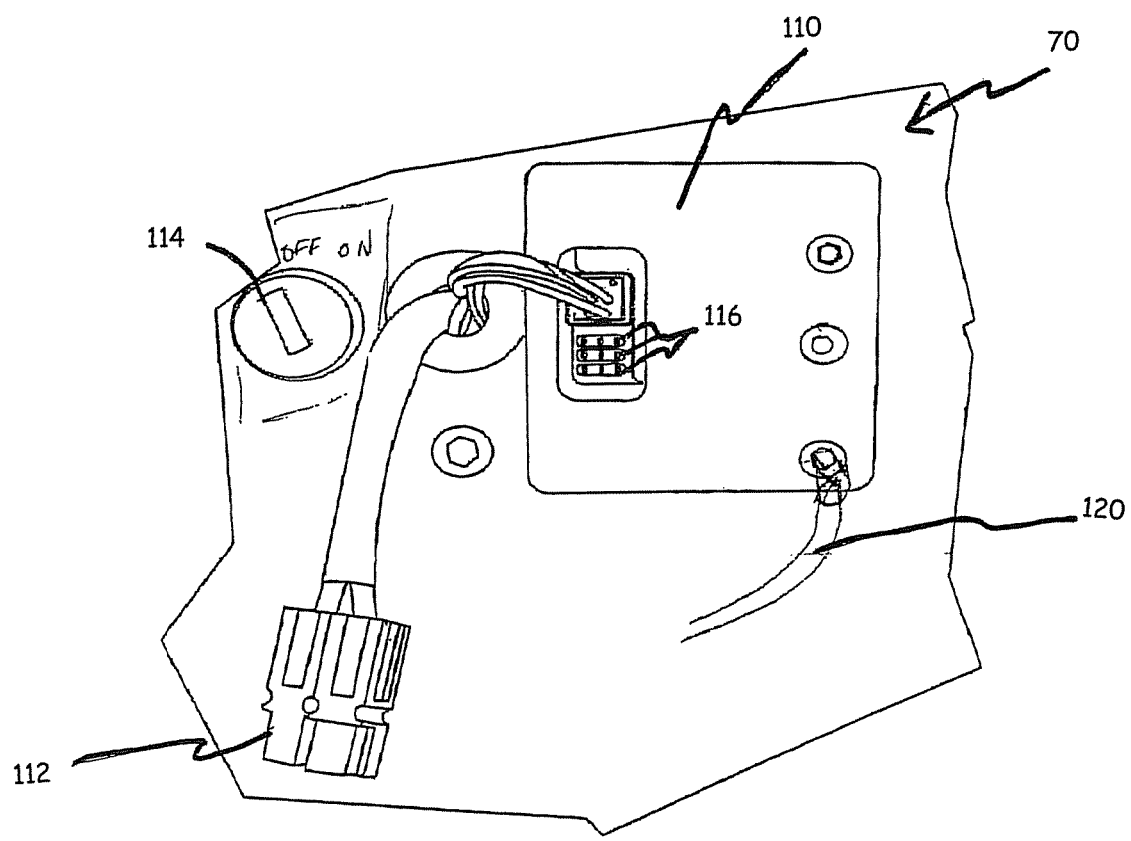
FIG. 16 is fragmentary perspective view of the signal receiver positioned on the outside of the brake module box of FIG. 8.
Figure 17:
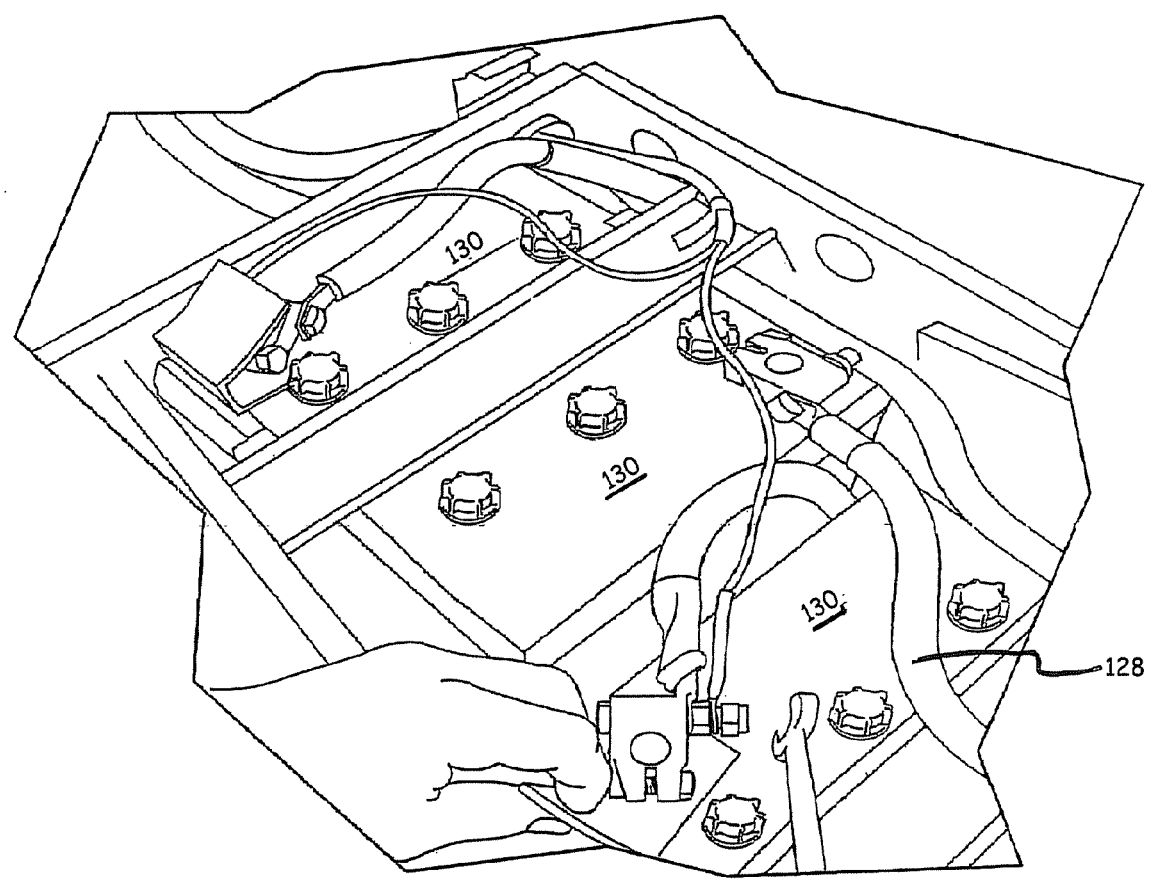
FIG. 17 is fragmentary perspective view of the batteries used in powering the invention stored under the passenger seat.

Electrical signals sent by hand-held remote control unit 150 are received by receiver 110 mounted on brake/throttle module 70. This is the control area. All electrical signals are transmitted from this receiver 110 by circuitry connectors 116 originating at receiver 110, illustrated at FIGS. 8 and 16. Electrical power from batteries 130 mounted under the passenger seat as illustrated in FIG. 17. On-off switch 114 is also mounted on brake/throttle module 70 as illustrated in FIGS. 8 and 16.

The method of installation is described for a Hummer® vehicle, although the elements of the kit could be installed in other vehicles in a similar manner.

As illustrated in FIGS. 3-5, the gear shift servo is installed in the following manner: position the gear shift stem 32 in Neutral (N); attach the shifter clamp block 36 to gear shift stem 32; position the shifter clamp block 36 up to the bottom of the gear shift knob 35; and position a washer 37 between the servo lever 34 and the shifter clamp block 36.

Screws on hold down bracket 38 are loosened to position the bracket onto shifter button 40 and screws are tightened to hold the shifter button 40 in the down position. The servo lever 34 is adjusted so the link is generally in a straight line parallel to the gear shift console 42 and the fasteners are tightened on the shift bracket 39 as illustrated at FIG. 5 with self-tapping screws or bolts. After all systems are installed, the servo lever 34 can be adjusted in length later if needed.

As illustrated in FIGS. 6-7, the engine start module servo 50 is installed in the following manner: the engine start servo bracket 52 is screw mounted to the dashboard 51 adjacent the starter switch 62. Because a Hummer vehicle is used, screws from the light switch module are removed to be used for attaching the engine start servo although the engine start servo could be used with other vehicles in a similar manner. The screws are loosened on the servo knob clamp block 58 and the one piece knob clamp block 58 is positioned to abut and enclose the starter switch 62 and tighten the screws. The knob clamp block 58 is a slave to the starter linkage arm 60 such that actuation of the light switch module 56 by electrical connection 54 causes the linkage arm 60 to actuate and turn on the start switch 62 held by knob clamp block 58.

As illustrated in FIGS. 8-12, brake/throttle module 70 is installed on the floor of the vehicle in front of the driver's seat. A clamp bar 72 is positioned behind the driver's seat mount 73, the module 70 being screw mounted onto the clamp bar 72, as illustrated in FIG. 9, anchoring brake/throttle module to the vehicle floor. An actuation bar 84 is mounted to brake/throttle module 70 by a screw mounted to pivot 86. Mounted to opposite ends of pivoting actuation bar 84 are throttle linkage arm 74 and brake linkage arm 76. Adjustment holes are provided to adjust the distance between throttle linkage arm 74 and brake linkage arm 76 so they are positioned parallel to each other and become longitudinal extensions of throttle pedal 75 and brake pedal 77. As indicated in FIG. 12, each of these linkage arms, 74, 76 terminates with a ring 89 which receives a spindle 71 which is in turn mounted to a brace 87 which is screw mounted to the topmost portion of a three-piece pedal clamp 80, 82 positioned at a distal end of each linkage arm, throttle linkage arm distal end 83 and brake linkage arm distal end 85. The three-piece pedal clamps 80, 82 have a planar first element and a pair of adjustable L-shaped portions which are screw mounted about a portion of the respective pedals, throttle 75 and brake 77 gripping the pedal within the clamp 80, 82. The linkage arms are adjustable in length. During installation, the actuation bar 84 is positioned in a neutral position (straight across the brake/throttle actuator 70) and the linkage arms are attached to the respective pedals while the brake and throttle pedals are in their resting positions. In use pivoting of the actuation bar 84, in response to electrical signals received by the brake/throttle module 70, extends either the throttle linkage arm 74 or brake linkage arm 76 and the attached throttle pedal 75 or brake pedal 75 which act as slaves to their respective linkage arms.

Figure 18:
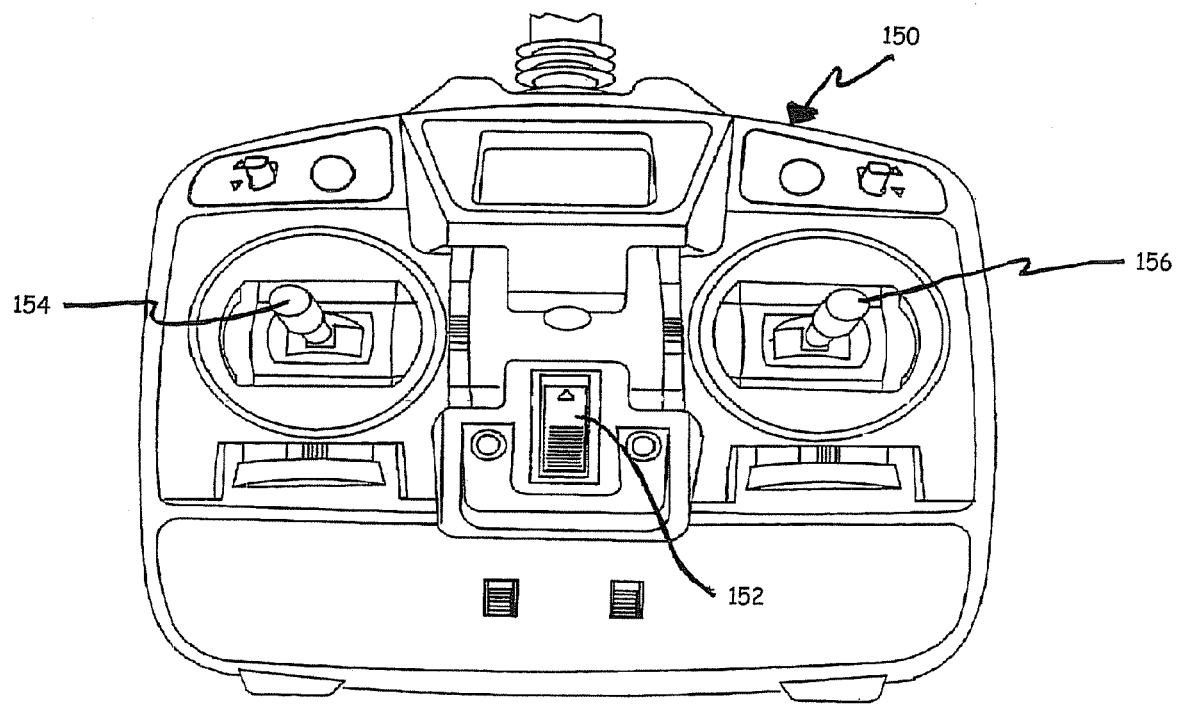
FIG. 18 is a front view of the hand-held remote controller unit.
Figure 19:
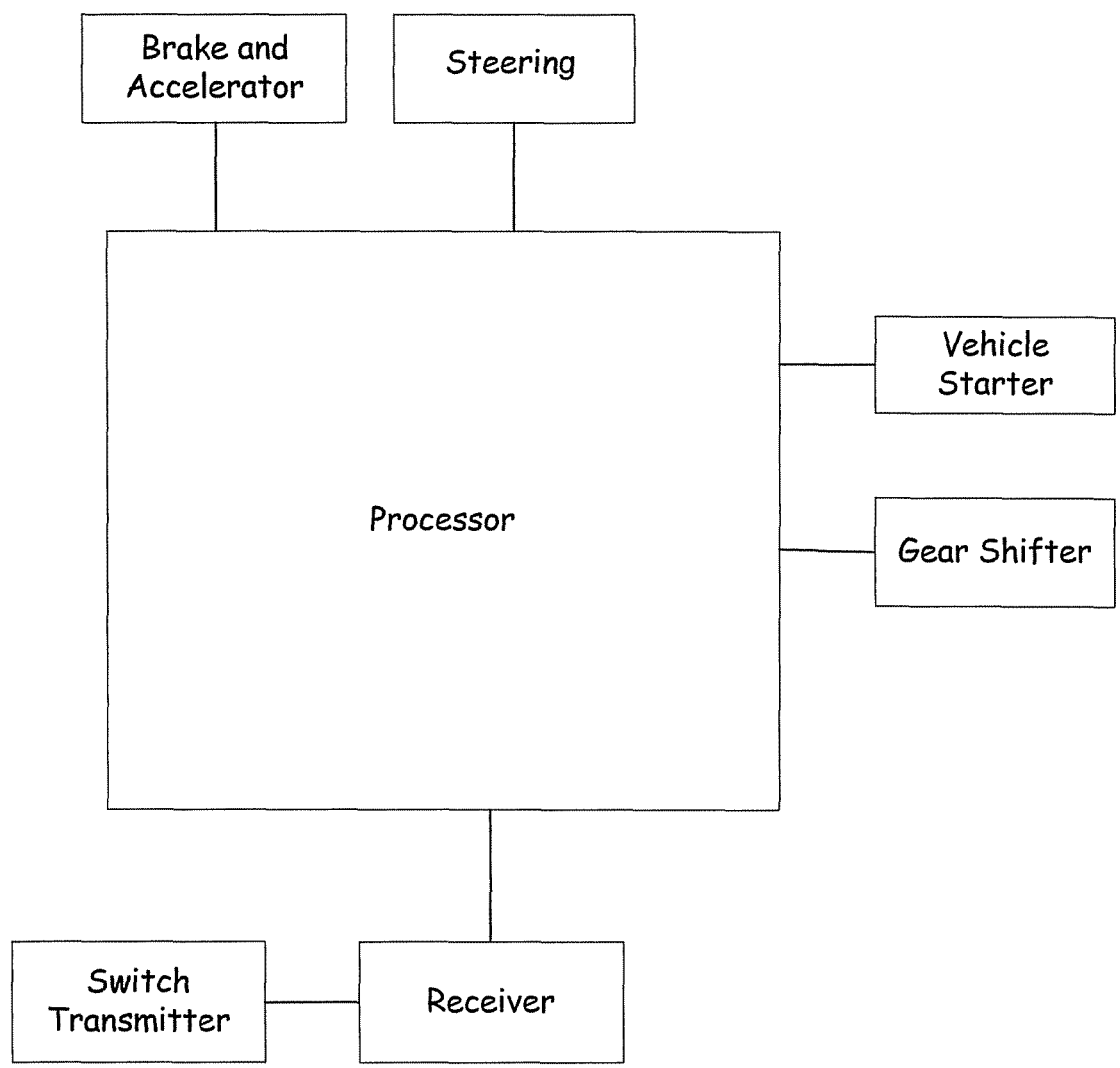
FIG. 19 is a schematic view of the transmitter/processor/actuator electrical system.

As illustrated at FIG. 8, a signal receiver 110 is mounted on the brake/throttle actuator 70 for receiving signals from the hand-held unit illustrated in FIG. 18. Also shown is circuitry connector 116 which is provided in the kit with the electrical connection for actuating the throttle/brake module in the top connectors, illustrated in detail in FIG. 16. Other three-pin connectors are used for providing electrical communication to the individual modules for actuating for example the steering module, the engine start module, the throttle/brake module and the transmission shifter. ON/OFF switch 114, also mounted on the throttle/brake module 70, must be manually turned on before the signal receiver 110 and all of the there-attached actuators can be powered. Electrical power is transferred into the throttle/brake module 70 from battery 130 mounted for use under the passenger seat by electric cable 128.

Figure 13:
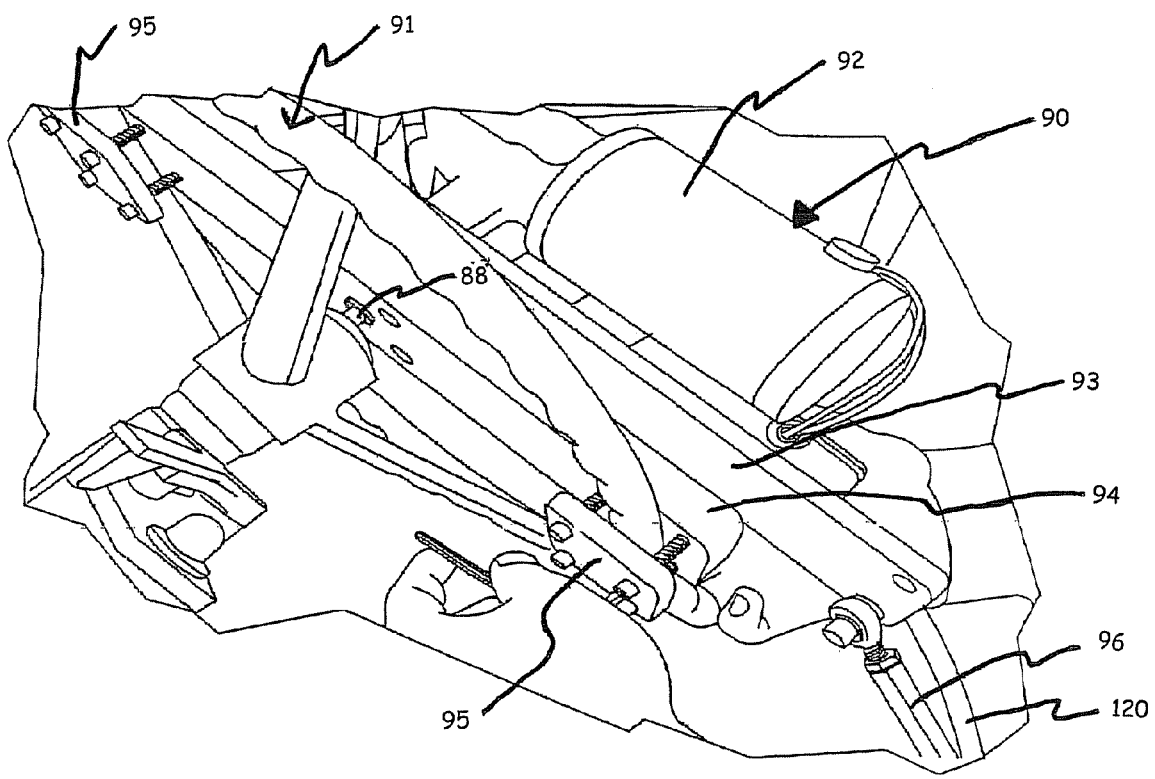
FIG. 13 is a fragmentary side perspective view of the steering mount being installed on the vehicle steering wheel.

Steering module 90, illustrated in FIGS. 13-15, includes an actuation motor 92, drive gear box 102, modified to contain larger sized gears to provide more driving torque to actuate the factory built steering, is mounted to steering wheel mount bar 94, with associated clamping plates 95, to mount the steering module 90 to the factory provided steering wheel 91. During installation, with the vehicle wheels positioned in a neutral position generally facing forward and the there-associated steering wheel 91 also in a neutral position, the wheel mount bar 94 is positioned generally horizontally across the front surface of the steering wheel 91 and clamped into position with the aid of the clamping plates 95 and screw mounted to the underside of the steering wheel 91. The wheel mount bar 94 is fixedly mounted to the steering wheel 91 and during operation, moves with the steering wheel 91 as it rotates in the normal manner. On the top surface of the mount bar 94, by means of a pivot 100, motor mount bar 93 is mounted that moves independently of the steering wheel 91, keeping a generally horizontal position even as the steering wheel 91 rotates in the normal manner during driving of the vehicle. Fixedly positioned on the motor mount bar 93 are the other components of the steering module 90, namely the actuation motor 92 and the drive gear box 102. Mounted to an outside end of the mount bar 93 is a torque arm 96 anchored to the floor of the vehicle by torque arm bracket 98 adjacent the driver's seat, as illustrated at FIG. 15 provided to stabilize the steering module 90 in its position on steering wheel 71. Electrical connection 120 provides electric communication from throttle/brake module 70 into electrical connector 104 mounted on motor mount bar 93.

FIG. 17 illustrates the multiple battery component 130 stored under the passenger seat of the vehicle with connection made by electric cable 128. FIG. 18 illustrates a hand-held remote control unit 150 with the ON/OFF switch 152, gear shift control 154 and steering control 156. The throttle and brake as also controlled by steering control 156.

The remote controller kit system of this invention, once installed, is operated by an operator following in a trailing vehicle. Additionally, video components may be added to the remote controlled vehicle such that the operator in the trailing vehicle, or at some other remote location, can view the route the remote controlled vehicle is taking. The remote controller kit system of this invention is easily installed and can be installed in approximately one hour, eliminating a need for a robot system.

Although the present invention has been described with reference to preferred embodiments, workers skilled in the art will recognize that changes may be made in form and detail without departing from the spirit and scope of the invention.

Although the present invention has been described with reference to preferred embodiments, workers skilled in the art will recognize that changes may be made in form and detail without departing from the spirit and scope of the invention.

What is claimed is:

1. A kit for remotely controlling a motor vehicle capable of carrying passengers, the kit comprising:
    an engine starter module for mounting in the motor vehicle for engaging a vehicle starter switch for starting the motor vehicle;
    a steering module for mounting in the motor vehicle for engaging a steering wheel to effect steering of the steering wheel in response to electrical signals; wherein the steering module further comprises a steering wheel mount bar, the mount bar crossing the vehicle steering wheel and clamped to a first and second opposing side of the vehicle steering wheel; and a motor mount bar pivotally mounted to the steering wheel mount bar, the motor mount bar remaining in a generally horizontal position during movement of the vehicle steering wheel;
    an activation motor, a drive gear box and a torque arm configured to be mounted on the motor mount bar wherein the torque arm is further configured to engage the motor mount bar at one end and a vehicle floor at another end;
    a brake and throttle module configured to mount in the motor vehicle and effect actuating of a vehicle throttle pedal and brake pedal and effect braking and actuation of the throttle in response to electrical signals;
    a gear shift module for mounting in the motor vehicle configured to engage a gear shift lever to shift gears;
    a hand-held remote controller unit for transmitting signals; and
    a receiver for mounting in the motor vehicle to receive receiving signals from the hand-held remote controller.

2. The kit of claim 1 wherein said engine starter model further comprises a switch module actuator with a linkage arm having a clamp for attachment to the vehicle starter switch.

3. The kit of claim 1 wherein the brake and throttle module further comprises:
    a mounting mechanism for mounting the brake and throttle module to a vehicle floor;
    an actuation bar for pivotal mounting to the mounting mechanism, the actuation bar having a first end and a second end;
    a throttle linkage arm mounted at one end to the first end of the actuation bar, and having a throttle pedal clamp for attachment to a throttle pedal of the vehicle; and
    a brake linkage arm mounted at one end to the second end of the actuation bar, and having a brake pedal clamp at another end for clamping to the brake pedal.

4. The kit of claim 1 wherein the gear shift module further comprises:
    a gear shift clamp for mounting to a vehicle gear shift stem;
    a hold-down bracket for mounting to a vehicle shift button for holding down the vehicle shift button for enabling shifting of a vehicle gear shift; and
    a linkage arm for attachment to a vehicle at one end and attached to the gear shift clamp at another end.

5. The kit of claim 3 and further comprising a brake throttle receiver for receiving electrical signals from the hand-held remote controller, and a brake and throttle motor attached to the actuation bar for pivotally moving the actuation bar.

6. The kit of claim 4 wherein the gear shift module further includes a gear shift servo motor attached to the linkage arm for moving the linkage arm.

7. A method for remotely controlling a full-sized motor vehicle, comprising the steps of:
    installing a gear shift module adjacent a factory gear shift in a vehicle such that the factory installed shifter button is depressible for shifting the vehicle gearshift in response to actuation signals being received;
    positioning an engine start servo adjacent the vehicle started switch;
    mounting a brake throttle module on the floor of the vehicle in front of the vehicle drivers' seat and attaching the throttle linkage arm to a throttle pedal by means of a three-piece pedal clamp and attaching a brake linkage arm to a vehicle brake by means of the three-piece brake pedal clamp;
    clamping a steering wheel mount bar to first and second opposing sides of a vehicle steering wheel and mounting a motor mount bar to the wheel mount bar, the motor mount bar configured to remain generally horizontal while the vehicle steering wheel moves and an actuation motor, a drive gear box and an electrical connector are mounted on the motor mount bar;
    anchoring a torque arm at a first end thereof at a first end of the motor mount bar and at a second end on a vehicle floor adjacent a vehicle driver's seat, the torque arm for stabilizing the steering module; and
    attaching electrical connections from each element to their respective electrical connectors on the brake/throttle module; and
    controlling the vehicle with a remote control by transmitting signals to a receiver.

\* \* \* \* \*